(12) United States Patent
Robinson

(10) Patent No.: US 11,745,540 B1
(45) Date of Patent: Sep. 5, 2023

(54) TIRE AND WHEEL ASSEMBLY LIFTING DEVICE

(71) Applicant: Kevin A. Robinson, Brighton, CO (US)

(72) Inventor: Kevin A. Robinson, Brighton, CO (US)

(*) Notice: Subject to any disclaimer, the term of this patent is extended or adjusted under 35 U.S.C. 154(b) by 268 days.

(21) Appl. No.: 17/124,364

(22) Filed: Dec. 16, 2020

Related U.S. Application Data

(60) Provisional application No. 62/958,238, filed on Jan. 7, 2020.

(51) Int. Cl.
    *B66F 15/00*      (2006.01)
    *B60B 29/00*      (2006.01)

(52) U.S. Cl.
    CPC ............ *B60B 29/002* (2013.01); *B66F 15/00* (2013.01)

(58) Field of Classification Search
    CPC . B60B 29/002; B60B 39/001; B60B 33/0044; B66F 15/00
    USPC ............................... 254/131, 119, 120, 131.5
    See application file for complete search history.

(56) References Cited

U.S. PATENT DOCUMENTS

| | | | | |
|---|---|---|---|---|
| 2,135,802 | A | * | 11/1938 | Dinkins ................ B60B 29/002 414/428 |
| 2,483,908 | A | * | 10/1949 | Jackson ................ B60B 29/002 414/428 |
| 3,828,955 | A | | 8/1974 | Harkey |
| 4,350,470 | A | | 9/1982 | Murillo |
| 4,872,694 | A | | 10/1989 | Griesinger |
| 5,562,389 | A | * | 10/1996 | Mitchell ................. B66F 15/00 414/428 |
| 5,984,611 | A | | 11/1999 | Warner |
| 7,431,314 | B2 | * | 10/2008 | Donaldson ............ B60B 29/002 280/47.27 |
| 10,967,490 | B2 | * | 4/2021 | Paskvan ................ E04G 17/045 |
| D950,183 | S | * | 4/2022 | Spears .................... B66F 15/00 D34/28 |
| 2018/0345725 | A1 | * | 12/2018 | Teal ...................... B60B 29/001 |

FOREIGN PATENT DOCUMENTS

GB          2260117 A      4/1993

* cited by examiner

*Primary Examiner* — Lee D Wilson
*Assistant Examiner* — Shantese L McDonald
(74) *Attorney, Agent, or Firm* — QUICKPATENTS, LLC; Kevin Prince

(57) ABSTRACT

A device for lifting a wheel and rolling the wheel on a surface includes an elongated rigid plate having a top side, a bottom side, a peripheral edge, a pedal portion at a rear end of the rigid plate, and a wheel portion at a forward end of the rigid plate. A roller is fixed with the bottom side of the rigid plate and the peripheral edge of the wheel portion at the forward end of the rigid plate is bent upward to form a tire-tread engaging lip, at least a portion of which engages a tread of the wheel. In use, with the wheel resting on the wheel portion, the pedal portion may be pressed downwardly to pivot the rigid plate about the roller to lift the wheel. The lifting device is then rolled on the surface to place the wheel at a desired position.

15 Claims, 6 Drawing Sheets

TIRE AND WHEEL ASSEMBLY LIFTING DEVICE

CROSS-REFERENCE TO RELATED APPLICATIONS

This application claims the benefit of U.S. Provisional Patent Application 62/958,238, filed on Jan. 7, 2020, and is incorporated herein by reference.

STATEMENT REGARDING FEDERALLY SPONSORED RESEARCH AND DEVELOPMENT

Not Applicable.

FIELD OF THE INVENTION

This invention relates to automotive repair, and more particularly to a device for facilitating the lifting of tires and wheel assemblies.

BACKGROUND

When changing or rotating tires on a vehicle, it is cumbersome to lift and simultaneously rotate and position the wheels for mounting on the vehicle. Such wheels, which typically include a tire mounted to a wheel rim, can be heavy and difficult to align with the vehicle.

Therefore, there is a need for a device that allows a person to easily lift and position the wheel for mounting (or dismounting) from a vehicle, or the like. The needed device would be relatively simple to manufacture and intuitive to use, and would engage the wheel at a tire tread for stability. The present invention accomplishes these objectives.

SUMMARY OF THE INVENTION

The present device is a lifting device for lifting a wheel and rolling the wheel on a surface, such as when installing the wheel onto a vehicle, for example. An elongated rigid plate has a top side, a bottom side, at least one peripheral edge, a pedal portion at a rear end of the elongated rigid plate, and a wheel portion at a forward end of the elongated rigid plate.

A roller is fixed with the bottom side of the elongated rigid plate proximate the wheel portion. The roller has two opposing ends. In some embodiments a pair of roller tabs are formed from the elongated rigid plate and bent downwardly from two opposing sides of the elongated rigid plate to rotationally capture the ends of the roller, such as with a mechanical fastener such as a threaded shaft and nut arrangement, for example. Alternately a U-shaped roller holder is fixed to the bottom side of the elongated rigid plate, such as by welding, and the U-shaped roller holder holds each end of the roller therebetween.

The at least one peripheral edge of the wheel portion at the forward end of the elongated rigid plate is bent upward at least 80-degrees, and preferably closer to 90-degrees, to form a tire-tread engaging lip. Such a tire-tread engaging lip engages at least a portion of a tread of the wheel.

As such, in use, with the wheel resting on the wheel portion of the elongated rigid plate and with the tire-tread engaging lip engaged with the tread of the wheel, the pedal portion may be pressed downwardly such as with a person's foot to pivot the elongated rigid plate about the roller to lift the wheel. The lifting device is then rolled on the surface to place the wheel at a desired position for mounting on the vehicle.

The present invention is a device that allows a person to easily lift and position a wheel for mounting (or dismounting) from a vehicle, or the like. The present invention is relatively simple to manufacture and intuitive to use, and engages the wheel at a tire tread for stability. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
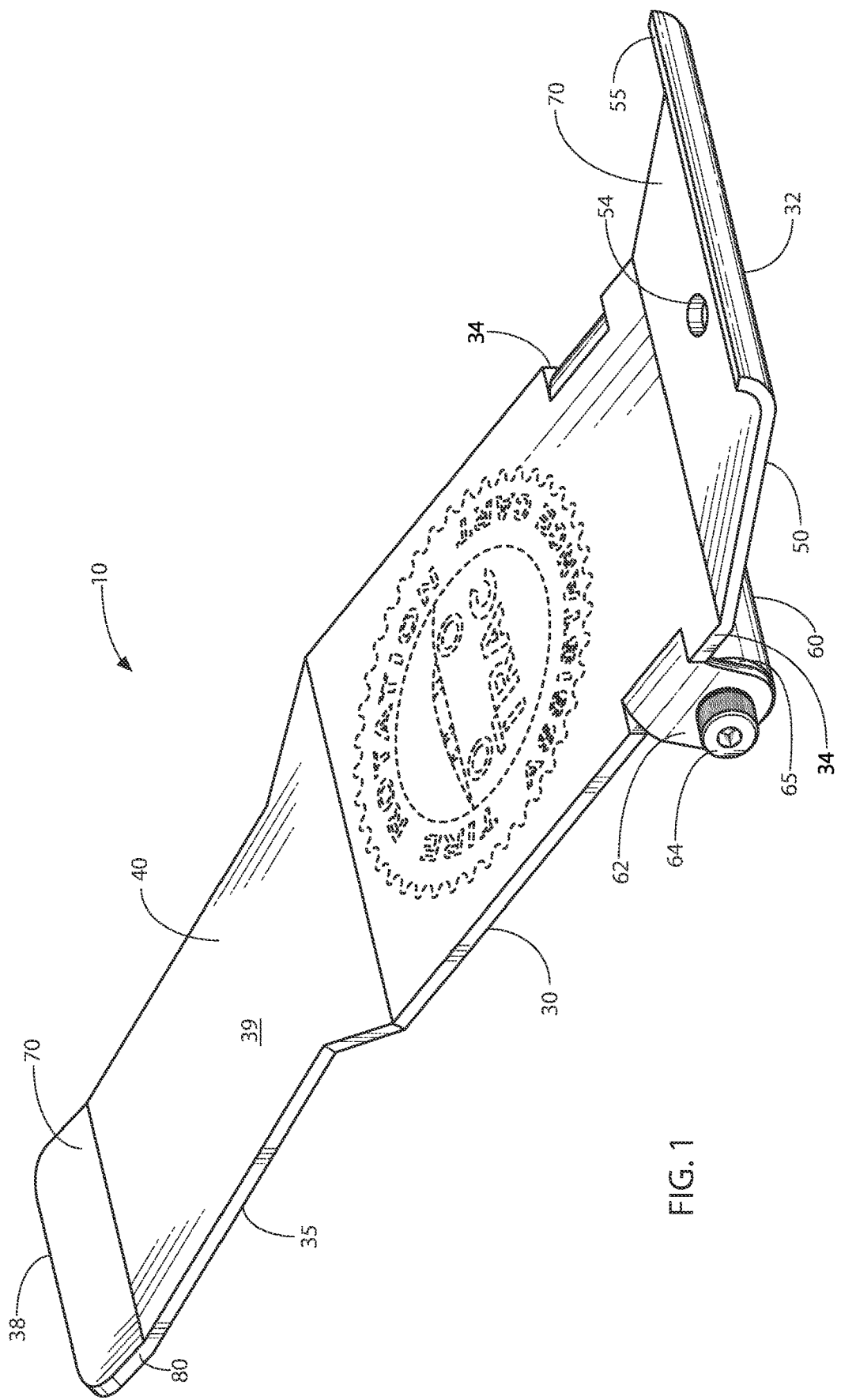
FIG. 1 is a top perspective view of the invention.
Figure 2:
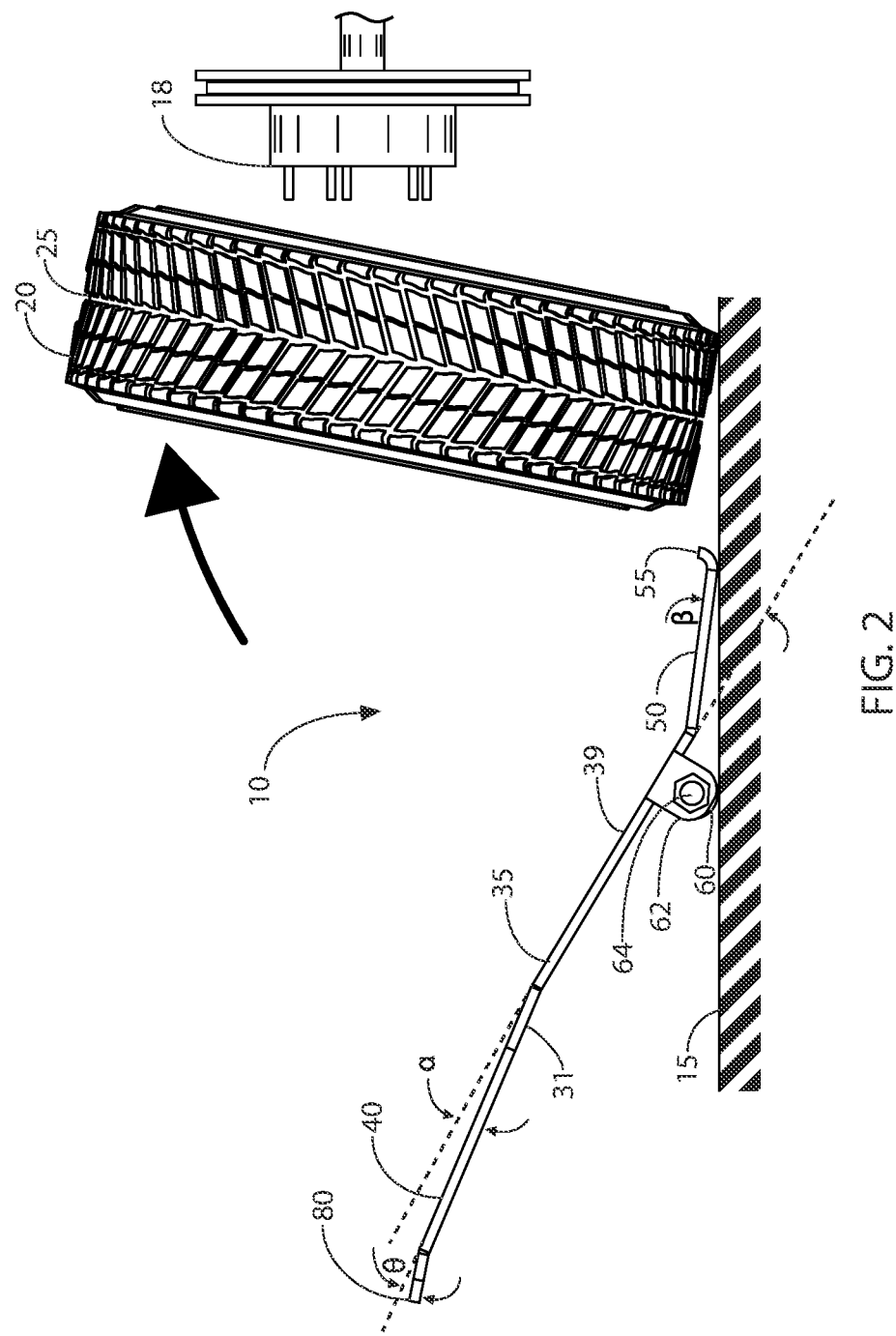
FIG. 2 is a side elevational view of the invention as approaching a wheel to lift.
Figure 3:
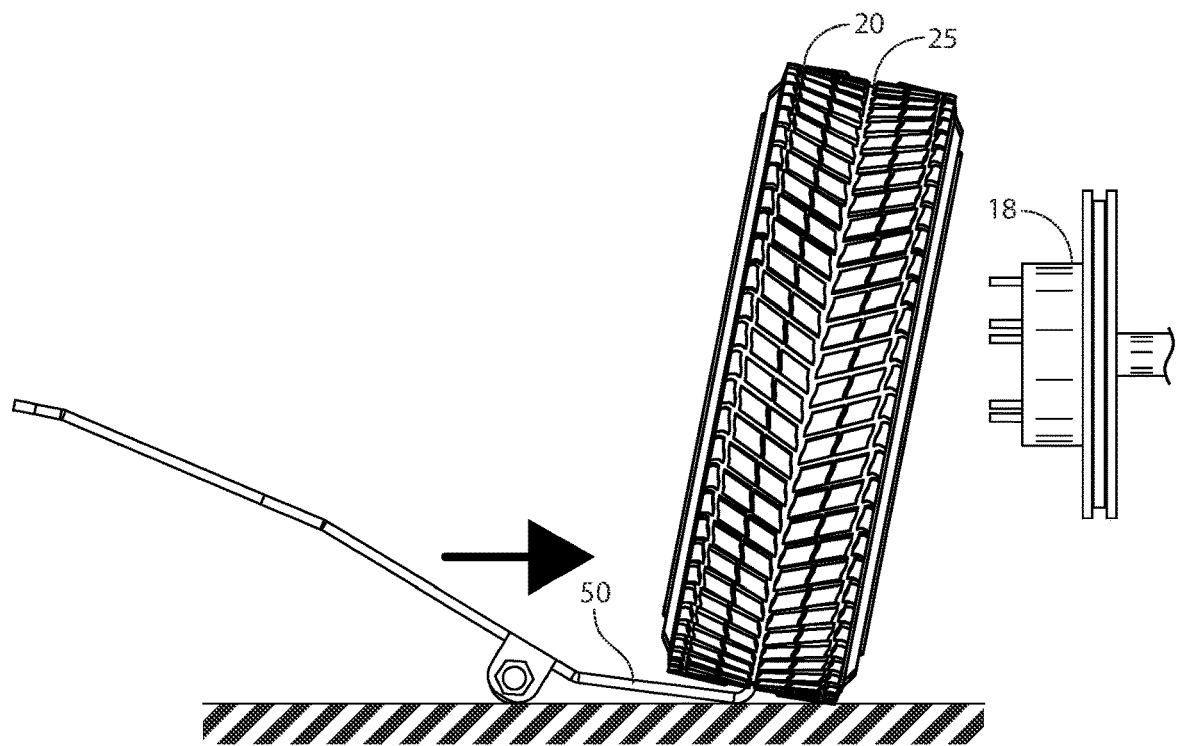
FIG. 3 is a side elevational view of the invention as positioned under the wheel.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

FIGS. 1-5 illustrate a lifting device 10 for lifting a wheel 20 and rolling the wheel 20 on a surface 15, such as when installing the wheel 20 onto a vehicle 18, for example. Typically it is cumbersome to simultaneously lift the wheel 20 while aligning the wheel 20 with the vehicle 18, and the present invention facilitates the lifting and mounting of the wheel 20 to the vehicle 18.

An elongated rigid plate 30 has a top side 39, a bottom side 31, at least one peripheral edge 35, a pedal portion 40 at a rear end 38 of the elongated rigid plate 30, and a wheel portion 50 at a forward end 32 of the elongated rigid plate 30. Preferably the elongated rigid plate 30 is made from a rigid sheet metal material, which is formed by stamping, water-jet, laser, or the like from a metal sheet material.

Figure 8:
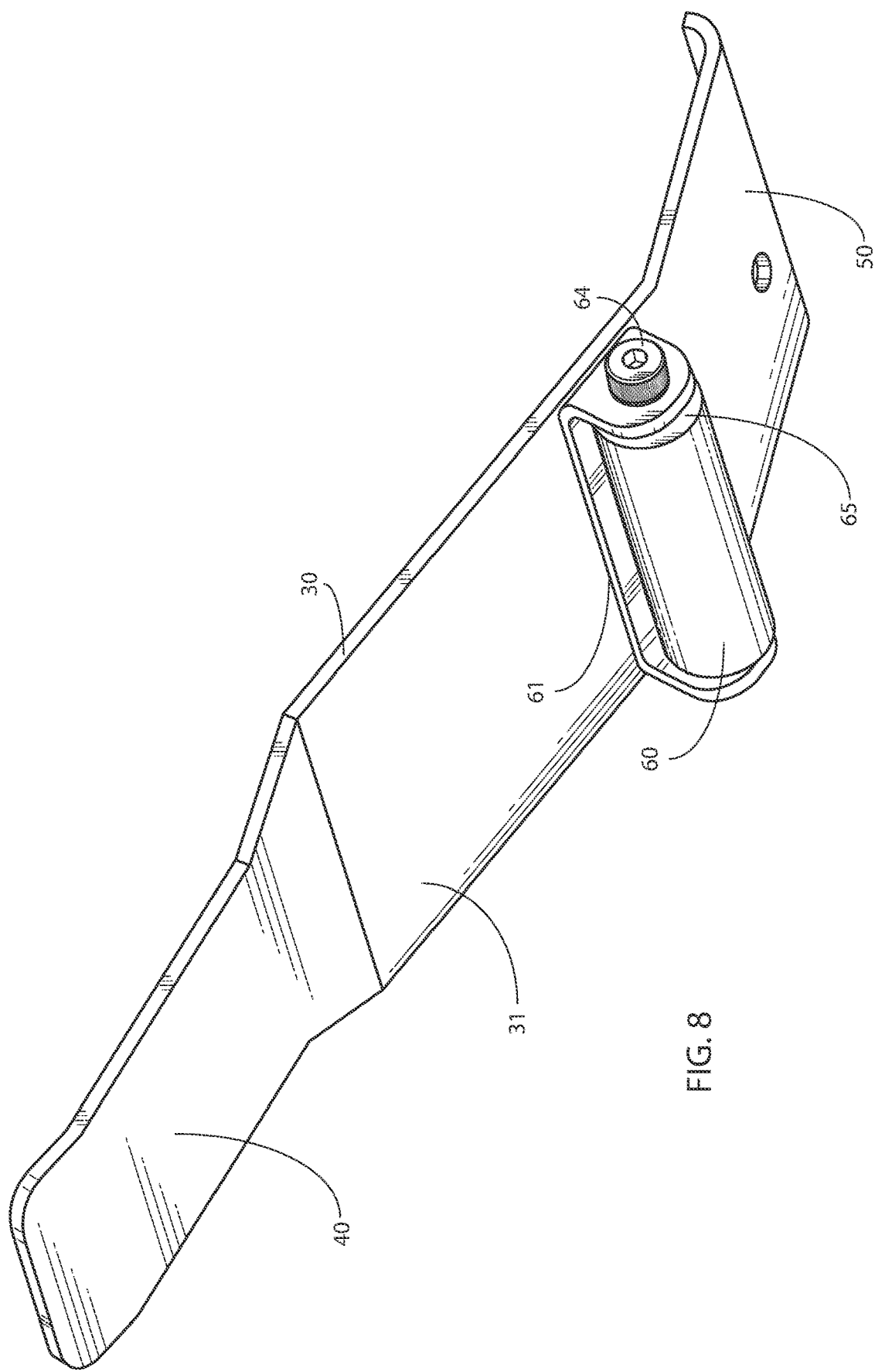
FIG. 8 is a bottom perspective view of another embodiment of the invention.

A roller 60 is fixed with the bottom side 31 of the elongated rigid plate 30 proximate the wheel portion 50. The roller 60 has two opposing ends 65. In some embodiments a pair of roller tabs 62 are formed from the elongated rigid plate 30 and bent downwardly from two opposing sides 34 of the elongated rigid plate 30 to rotationally capture the ends 65 of the roller 60, such as with a mechanical fastener 64 such as a threaded shaft and nut arrangement, for example. Alternately a U-shaped roller holder 61 (FIG. 8) is fixed to the bottom side 31 of the elongated rigid plate 30, such as by welding, and the U-shaped roller holder 61 holds each end 65 of the roller 60 therebetween.

The at least one peripheral edge 35 of the wheel portion 50 at the forward end 32 of the elongated rigid plate 30 is bent upward at least 80-degrees, and preferably closer to 90-degrees, to form a tire-tread engaging lip 55. Such a tire-tread engaging lip 55 engages at least a portion of a tread 25 of the wheel 20.

Figure 4:
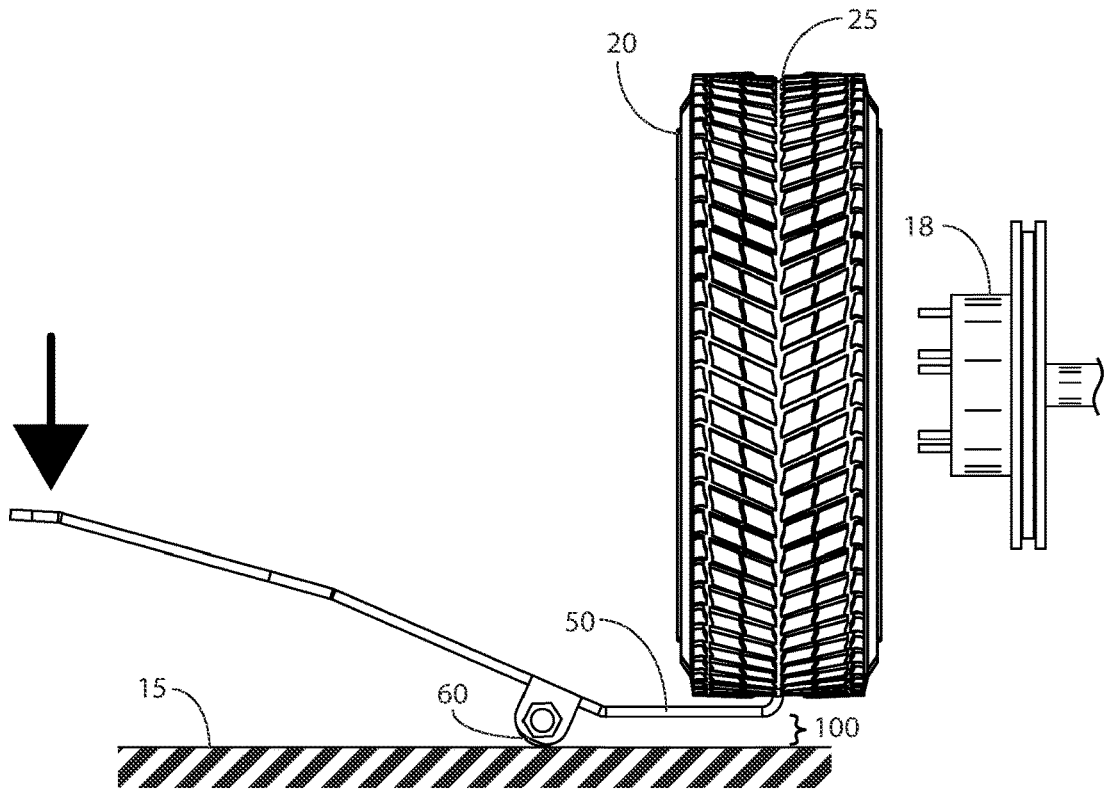
FIG. 4 is a side elevational view of the invention as lifted for mounting onto a vehicle.
Figure 5:
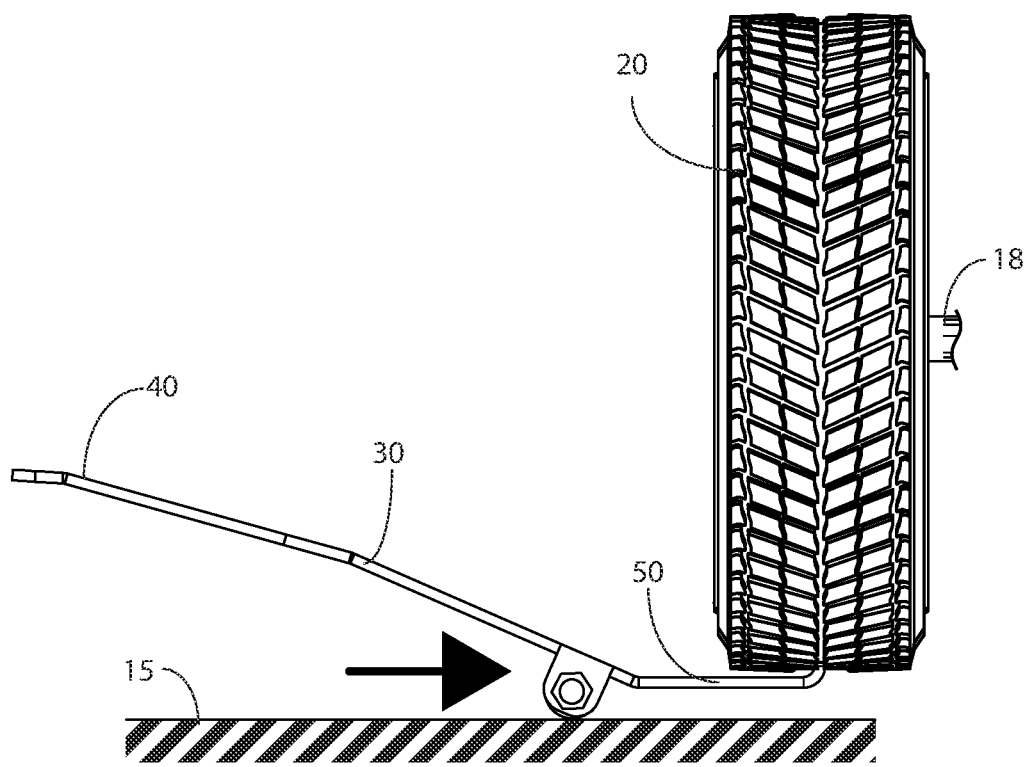
FIG. 5 is a side elevational view of the invention as rolled towards and then mounted to the vehicle.
Figure 6:
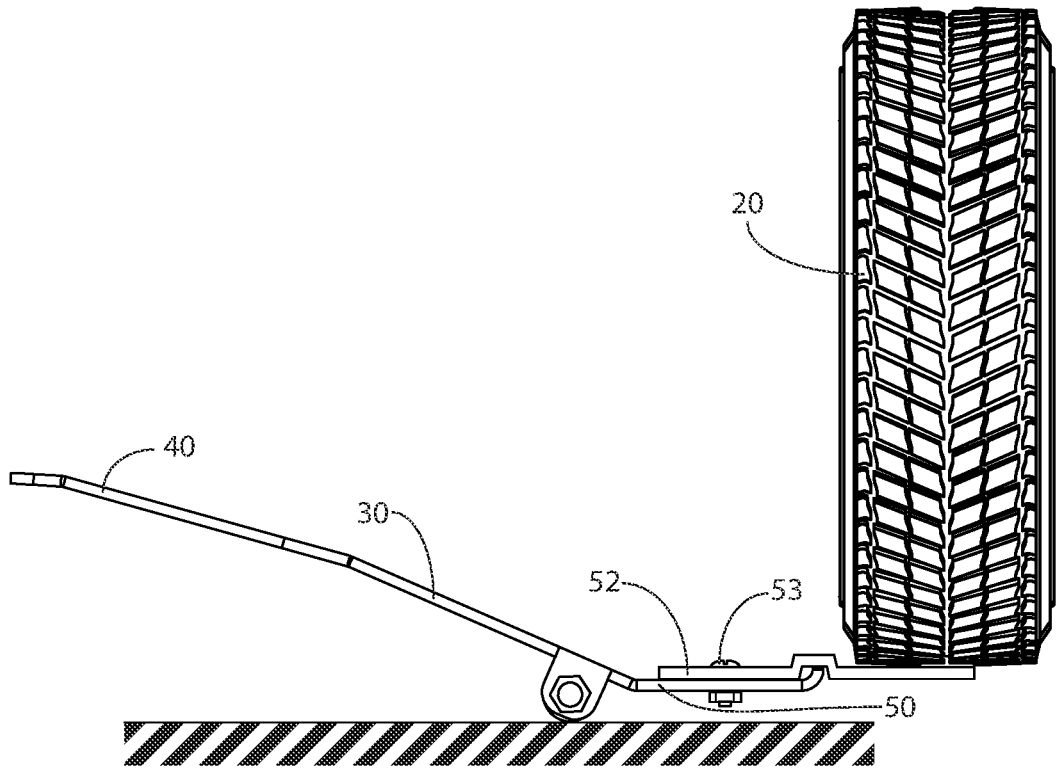
FIG. 6 is a side elevational view of the invention having an extension plate and supporting the wheel thereon.
Figure 7:
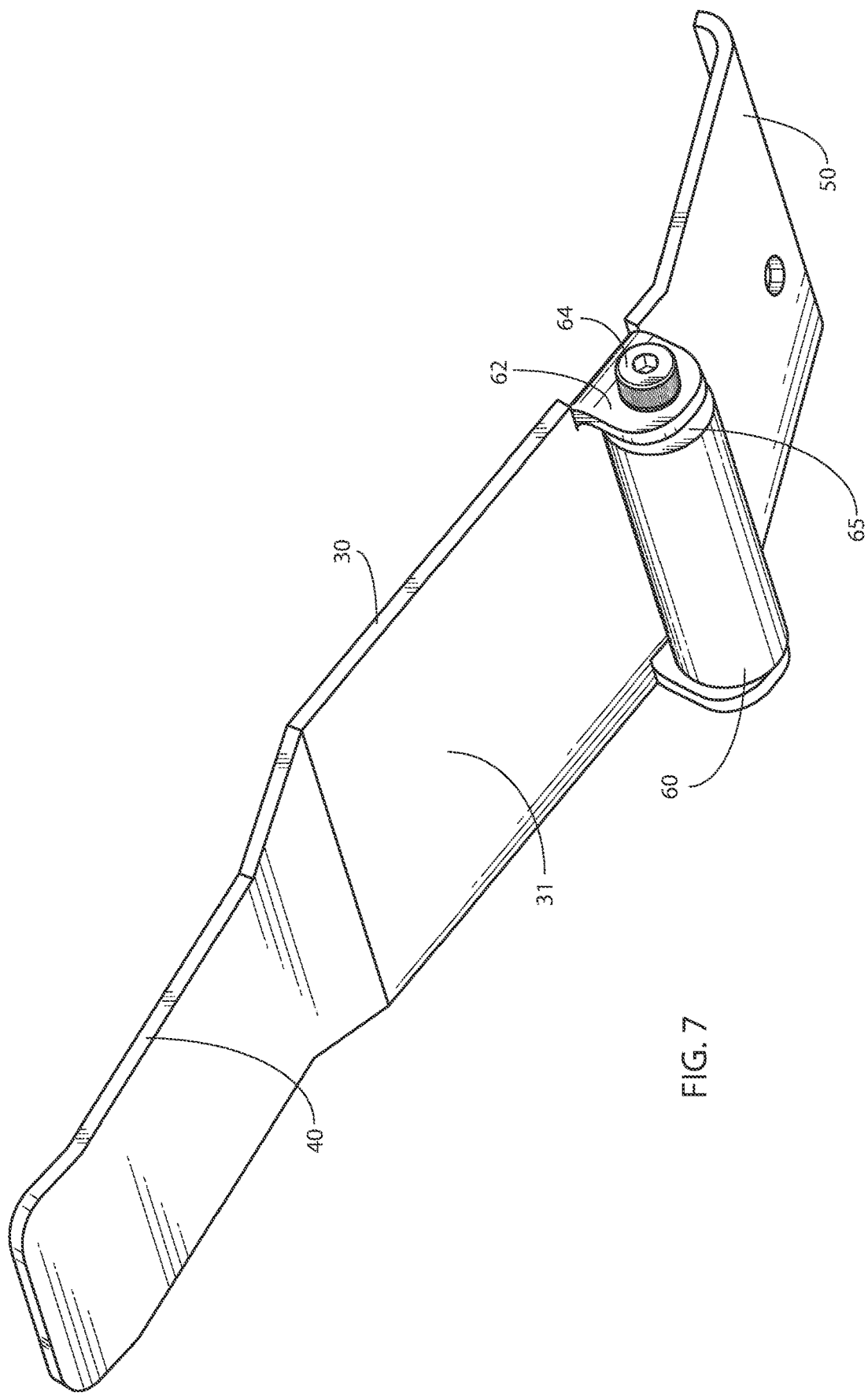
FIG. 7 is a bottom perspective view of one embodiment of the invention.

As such, in use, with the wheel 20 resting on the wheel portion 50 of the elongated rigid plate 30 and with the tire-tread engaging lip 55 engaged with the tread 25 of the wheel 20, the pedal portion 40 may be pressed downwardly such as with a person's foot to pivot the elongated rigid plate 30 about the roller 60 to lift the wheel 20. The lifting device 10 is then rolled on the surface 15 to place the wheel 20 at a desired position for mounting on the vehicle 18. A gap 100 is defined between the surface 15 and the wheel portion 50 of the elongated rigid plate 30, the wheel portion 50 being substantially parallel with the surface 15 (FIGS. 4-6).

In some embodiments the wheel portion 50 of the elongated rigid plate 30 includes an aperture 54 (FIG. 1) for receiving a fastener 53 therethrough. The fastener 53 secures an extension plate 52 to the wheel portion 50 (FIG. 6). The extension plate 52 is preferably made from the same sheet metal material as is the elongated rigid plate 30.

In some embodiments an anti-slip friction coating 70 is applied to the top side 39 of the elongated rigid plate 30 at either the pedal portion 40, the wheel portion 50, or both. In some embodiments the pedal portion 40 of the elongated rigid plate 30 is narrower than the rest of the elongated rigid plate 30 (FIG. 1).

Preferably the pedal portion 40 terminates at a downwardly-angled foot-engaging portion 80 (FIGS. 1 and 2), which is downwardly-angled at between 10 to 15-degrees (θ) with respect to the rest of the pedal portion 40. The pedal portion 40 is preferably downwardly-angled at between 5 to 10-degrees (α) with respect to the rest of the elongated rigid plate 30. The wheel portion 50 of the elongated rigid plate 30 is preferably upwardly-angled at between 20 to 30-degrees (β) with respect to the rest of the elongated rigid plate 30.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A lifting device for lifting a wheel and rolling the wheel on a surface, comprising:
   an elongated rigid plate having a top side, a bottom side, at least one peripheral edge, a pedal portion at a rear end thereof, and a wheel portion at a forward end thereof;
   a roller fixed with the bottom side of the elongated rigid plate proximate the wheel portion, the roller having two opposing ends;
   the at least one peripheral edge, the top side, and the bottom side of the wheel portion at the forward end of the elongated rigid plate each bent to curve and extend upward at least 80-degrees to form a tire-tread engaging lip, the tire-tread engaging lip including a forward-most edge of the elongated rigid plate that is defined between at least the top side and the bottom side of the wheel portion at the forward end of the elongated rigid plate, wherein with the roller and the wheel portion resting on the surface, the forwardmost edge of the elongated rigid plate faces upward;

whereby with the wheel resting on the wheel portion of the elongated rigid plate and the tire-tread engaging lip engaged with the wheel, the pedal portion may be pressed downwardly to pivot the elongated rigid plate about the roller to lift the wheel, the lifting device then rollable on the surface to place the wheel at a desired position.

2. The lifting device of claim 1 wherein the roller is fixed with the bottom side of the elongated rigid plate with a pair of roller tabs formed from the elongated rigid plate and bent downwardly from two opposing sides thereof to rotationally capture the ends of the roller.

3. The lifting device of claim 1 wherein the roller is fixed with the bottom side of the elongated rigid plate with a U-shaped roller holder that rotationally captures the ends of the roller therein.

4. The lifting device of claim 1 wherein the wheel portion of the elongated rigid plate includes an aperture for receiving a fastener therethrough, the fastener adapted for fixing an extension plate to the wheel portion.

5. The lifting device of claim 1 wherein the top side of the wheel portion includes an anti-slip friction coating.

6. The lifting device of claim 1 wherein the top side of the pedal portion includes an anti-slip friction coating.

7. The lifting device of claim 1 wherein the pedal portion of the elongated rigid plate is narrower than the rest of the elongated rigid plate.

8. The lifting device of claim 7 wherein the pedal portion terminates at a downwardly-angled foot-engaging portion.

9. The lifting device of claim 7 wherein the pedal portion of the elongated rigid plate is downwardly-angled with respect to the rest of the elongated rigid plate.

10. The lifting device of claim 1 wherein the pedal portion of the elongated rigid plate is downwardly-angled with respect to the rest of the elongated rigid plate.

11. The lifting device of claim 1 wherein the wheel portion of the elongated rigid plate is upwardly-angled with respect to the rest of the elongated rigid plate.

12. The lifting device of claim 11 wherein with the wheel portion of the elongated rigid plate substantially parallel to the surface and with the roller resting on the surface, a gap is defined between the surface and the wheel portion of the elongated rigid plate.

13. A lifting device for lifting a wheel and rolling the wheel on a surface, comprising:

an elongated rigid plate having a top side, a bottom side, at least one peripheral edge, a pedal portion at a rear end thereof, and a wheel portion at a forward end thereof, the wheel portion and/or the pedal portion includes an anti-slip friction coating on the top sides thereof, the pedal portion of the elongated rigid plate being narrower than the rest of the elongated rigid plate, the wheel portion of the elongated rigid plate being upwardly-angled with respect to the rest of the elongated rigid plate;

a roller fixed with the bottom side of the elongated rigid plate proximate the wheel portion, the roller having two opposing ends;

the at least one peripheral edge, the top side, and the bottom side of the wheel portion at the forward end of the elongated rigid plate each bent to curve and extend upward at least 80-degrees to form a tire-tread engaging lip, the tire-tread engaging lip including a forwardmost edge of the elongated rigid plate that is defined between at least the top side and the bottom side of the wheel portion at the forward end of the elongated rigid plate, wherein with the roller and the wheel portion resting on the surface, the forwardmost edge of the elongated rigid plate faces upward;

wherein with the wheel portion of the elongated rigid plate substantially parallel to the surface and with the roller resting on the surface, a gap is defined between the surface and the wheel portion of the elongated rigid plate;

whereby with the wheel resting on the wheel portion of the elongated rigid plate and the tire-tread engaging lip engaged with the wheel, the pedal portion may be pressed downwardly to pivot the elongated rigid plate about the roller to lift the wheel, the lifting device then rollable on the surface to place the wheel at a desired position.

14. The lifting device of claim 13 wherein the roller is fixed with the bottom side of the elongated rigid plate with a pair of roller tabs formed from the elongated rigid plate and bent downwardly from two opposing sides thereof to rotationally capture the ends of the roller.

15. The lifting device of claim 13 wherein the roller is fixed with the bottom side of the elongated rigid plate with a U-shaped roller holder that rotationally captures the ends of the roller therein.

\* \* \* \* \*